(12) United States Patent
Van Der Plas

(10) Patent No.: US 7,341,372 B2
(45) Date of Patent: Mar. 11, 2008

(54) FEED MIXER WITH WEIGHT RESPONSIVE TRANSMISSION

(75) Inventor: Nicolaas Van Der Plas, Oldenzaal (NL)

(73) Assignee: Trioliet Mullos B.V., AC Oldenzaal (NL)

( * ) Notice: Subject to any disclaimer, the term of this patent is extended or adjusted under 35 U.S.C. 154(b) by 311 days.

(21) Appl. No.: 11/193,197

(22) Filed: Jul. 29, 2005

(65) Prior Publication Data

US 2006/0256647 A1 Nov. 16, 2006

(30) Foreign Application Priority Data

May 11, 2005 (DE) .................. 10 2005 021 851

(51) Int. Cl.
*B01F 7/24* (2006.01)
(52) U.S. Cl. .................. 366/141; 366/314; 366/603
(58) Field of Classification Search ............... 366/141, 366/301–302, 306–307, 266, 314, 603, 318–324; 241/101.76, 101.761, 101.8, 260.1, 605; 475/161; 477/98
See application file for complete search history.

(56) References Cited

U.S. PATENT DOCUMENTS

| 5,429,436 | A | * | 7/1995 | Stone | .................. 366/141 |
|---|---|---|---|---|---|
| 5,462,354 | A | | 10/1995 | Neier | |
| 5,465,914 | A | * | 11/1995 | Faccia | .................. 241/101.71 |
| 6,758,426 | B2 | | 7/2004 | Have | |
| 2004/0013035 | A1 | | 1/2004 | Tamminga | |
| 2005/0172741 | A1 | * | 8/2005 | Van Der Plas | |
| 2006/0256647 | A1 | * | 11/2006 | Van Der Plas | .................. 366/141 |

FOREIGN PATENT DOCUMENTS

| DE | 20119534 | | 4/2003 |
|---|---|---|---|
| DE | 10348206 A1 | * | 5/2005 |
| EP | 1529563 A1 | * | 5/2005 |

* cited by examiner

*Primary Examiner*—Charles E. Cooley
(74) *Attorney, Agent, or Firm*—Darby & Darby P.C.

(57) ABSTRACT

Described is a feed mixer comprising a mixing container for receiving feed, at least one mixing tool rotatingly arranged in the mixing container, a drive mechanism for driving the mixing tool, an automatically shiftable transmission which is connected to the drive mechanism and has a low shifting stage for a first speed and at least one higher shifting stage for a second speed, the second speed being higher than the first speed, a control mechanism for shifting the transmission, a mechanism for detecting the weight of the feed to be mixed, and a mechanism for comparing the detected weight with a predetermined limit value for at least the higher shifting stage, which is connected to the control mechanism such that a driving of the mixing tool via the higher shifting stage is only possible if the detected weight does not exceed the limit weight.

29 Claims, 3 Drawing Sheets

FEED MIXER WITH WEIGHT RESPONSIVE TRANSMISSION

Figure 1:
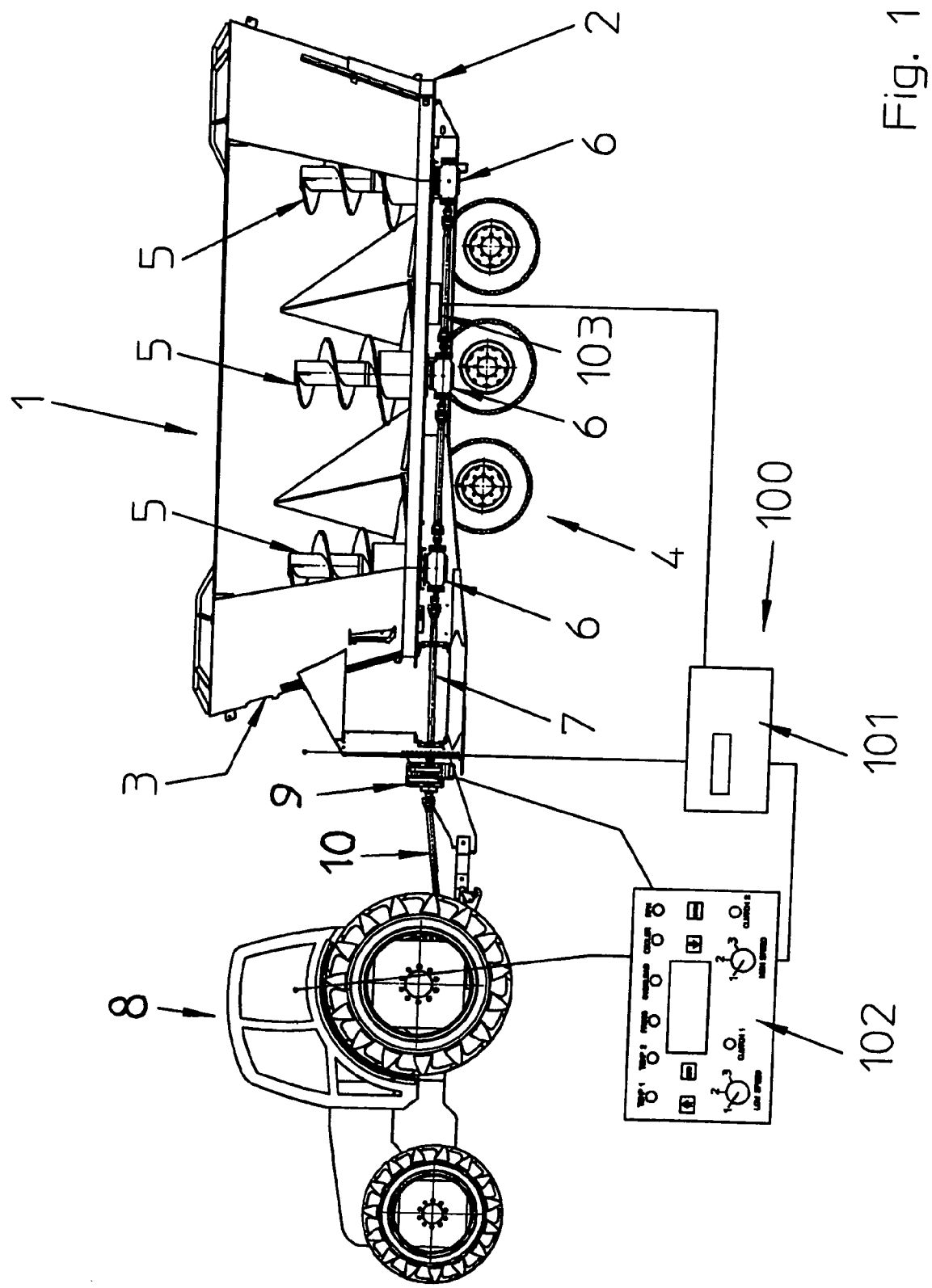

The invention relates to a feed mixer and to a method for driving a mixing tool of a feed mixer.

Feed mixers are increasingly employed in agriculture and serve to transport, mix and distribute feed. To this end feed mixers contain a mixing container in which at least one mixing tool is moved. The mixing tools are normally designed as mixing augers which are rotatingly driven about a vertical axis.

Feed mixers are most of the time movable via a traction drive. The traction drive may either be a tractor found in every agricultural enterprise, which has the feed mixer hitched thereto. However, it is also possible to provide other traction drives.

The drive of the mixing tool is derived from the traction drive (internal combustion engine), which when a tractor is used is accomplished through the power take-off shaft thereof. However, the loads arising on the mixing tools during use of the feed mixing wagon vary considerably. For instance, a high torque is needed if the mixing tools start to move a filled-in feed for the first time. By contrast, the necessary torque is very small if in an almost empty state of the feed mixer the last residues of the feed are pushed out of the mixing container. To meet these requirements, it has already been suggested that a transmission should be installed in the drive of the mixing tools, the transmission gearing up or down the speed supplied by the tractor, so that different torques can be provided.

A feed mixer which is equipped with a transmission is for example known from U.S. Pat. No. 5,462,354. The transmission is an automatically shifting transmission which is configured such that it shifts each time into the next higher or next lower gear at specific, previously determined or adjustable speed values. For instance, upon start of the mixing device in the empty state of the mixing container and after the drive has been activated via the power take-off shaft, shifting into the gear with the highest speed is carried out automatically and very rapidly, so that the mixing tool is rotating at its maximum speed. In a further embodiment, a torque converter is provided. When feed is introduced into the mixing container, the necessary torque increases due to friction and the cohesion of the feed in the mixer. If the load becomes so high that the speed falls below a shifting point, downshifting will be performed automatically. The known feed mixer has been configured originally for medium load sizes of up to 20 $m^3$. An automatic transmission of the above-described type is no longer suited for large machines (three mixing tools, 30 $m^3$ and more). A torque converter is not appropriate for starting under a high load and will only operate in an efficient manner at high speeds (above 1000 rpm). A rapid and repeated change between a high and a low gear also poses a problem because the torque requirement during the mixing cycle is not constant. It has turned out in practice that such automatic transmissions tend to shift too often and cyclically. As a rule, the mixing speed can no longer be controlled. The torque converter used in an embodiment does not operate efficiently at a low drive speed. When the drive (of the tractor) starts and cannot pull the mixing tool, the torque converter will slip and burn out. This will also happen when the drive means (of the tractor engine) stalls upon a high load. In this known feed mixer, specific gears can be blocked against upshifting by operating a hand-held lever if this is desired for operational reasons.

A further feed mixer comprising a transmission interposed between the drive and the mixing tool is known from U.S. Pat. No. 6,758,426. The attempt is made in this feed mixer to solve the problem of an undesired automatic shifting by the possibility of manually interfering with the shifting operations. Manually shiftable transmissions, however, are less suited for feed mixers. Feed mixers are most of the time operated by one person, i.e. the operator must first start the drive of the mixing tool, then leave the tractor, or the like, and fill the mixing container with another work means, such as a loading help, or the like. Manual shifting is not possible during this time interval.

German utility model 201 19 534 discloses a drive device on a feed mixing wagon in which an automatically shiftable transmission is provided between the drive and the mixing tool. During operation the instantaneous torque is detected during the whole period of use and the detected values are passed on to a control device which shifts the transmission accordingly. A direct torque measurement is however very complicated. Moreover, the same problem arises from undesired frequent shifting between the gears (cyclic shifting), as has already been described above.

It is thus the object of the present invention to overcome the above-mentioned drawbacks of the prior art.

It is above all the object of the present invention to prevent an undesired back-and-forth shifting between the gears.

It is above all the object of the present invention to provide a feed mixer in a method for the operation thereof in which the speed of the mixing tool can be controlled in a checked and predetermined manner.

It is above all the object of the present invention to provide a feed mixer and a method for the operation thereof that are configured such that damage to the drive or transmission is efficiently prevented.

Said objects are achieved by a feed mixer comprising a mixing container for receiving feed, at least one mixing tool being rotatingly arranged in the mixing container, a drive means for driving the mixing tool, an automatically shiftable transmission which is connected to the drive means and has a low shifting stage for a first speed of the mixing tool and at least one higher shifting stage for a second speed of the mixing tool, the second speed being higher than the first speed, a control means for shifting the transmission, a means for detecting the weight of the feed to be mixed, and a means for comparing the detected weight with a predetermined limit value for at least the higher shifting stage, which is connected to the control means such that a driving of the mixing tool via the higher shifting stage is only possible if the detected weight does not exceed the limit weight.

These objects are further achieved by a method for driving a mixing tool for mixing feed in a feed mixer, wherein the mixing tool is rotatingly driven by a drive via an automatically shiftable transmission with a low shifting stage at a low speed and with at least one higher shifting stage at a higher speed, wherein the weight of the feed is determined and compared with a predetermined limit value for at least the higher shifting stage, and wherein the mixing tool is only driven via the higher shifting stage if the detected weight does not exceed the limit value.

Figure 2:
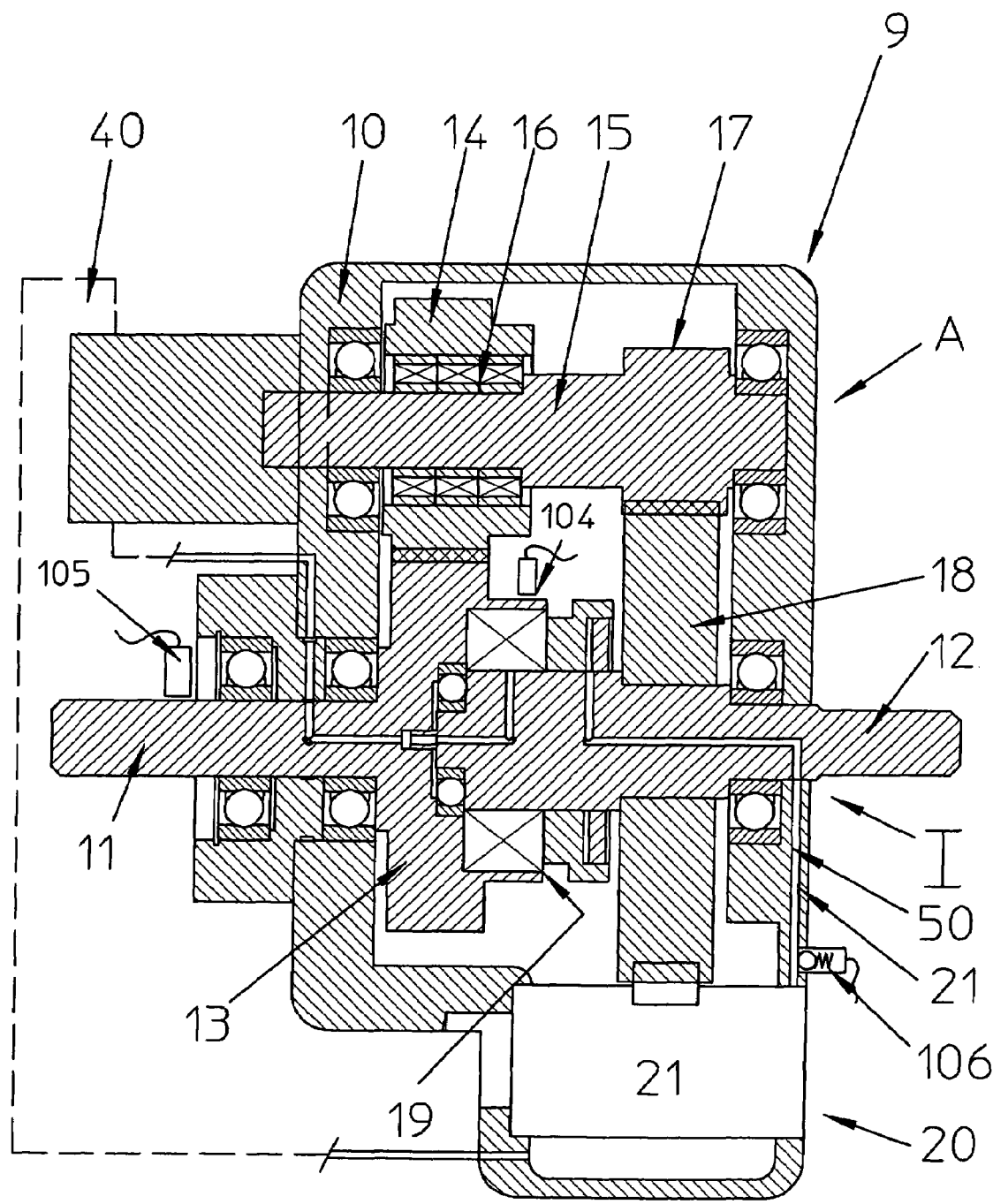
Figure 3:
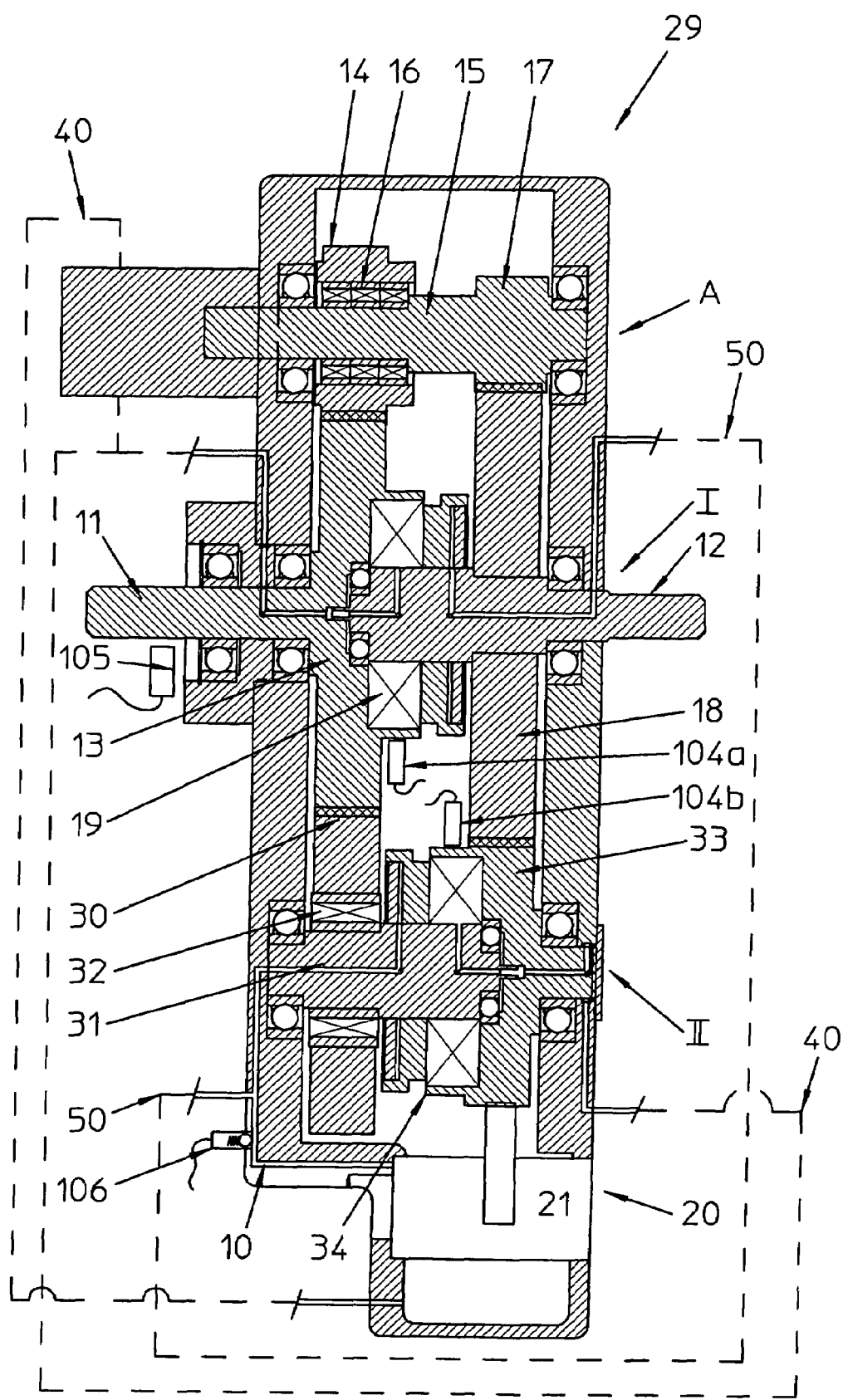

In the following, embodiments of the invention are illustrated in more detail with reference to the drawings. In the drawings:

FIG. 1 shows a feed mixer equipped according to the invention in a schematic representation in a side view;

FIG. 2 shows a sectional schematic representation of a first embodiment of a drive device according to the invention; and FIG. 3 shows a sectional schematic representation of a second embodiment of a drive device according to the invention, FIG. 1 shows a schematic representation of a feed mixer 1 designed as a mixing wagon in the illustrated embodiment. The feed mixer 1 includes a frame 2 with a container 3 which is displaceable via a chassis 4. The container 3 is illustrated in a sectional view in FIG. 1 to show the interior. The container 3 can be filled in the standard way via an upper opening and includes the standard lateral or rear openings through which the filled-in feed can be discharged out of the container 3.

In the illustrated embodiment, three mixing tools 5 are provided in the interior of the container 3, the tools being here configured as mixing augers, each being adapted to be rotatingly driven about a vertical axis of rotation. The invention can however also be employed for feed mixers having different mixing tools or a different number of mixing augers. Each of the mixing augers 5 is driven by one common drive shaft 7, each via an angular gear 6. The drive shaft 7 is driven by a traction drive, i.e. particularly by an engine of a tractor 8 which hauls the feed mixer 1, via an automatically shiftable transmission 9. Driving the drive shaft 7 via the transmission 9 is accomplished via the power take-off shaft 10 of a tractor 8 when such a tractor 8 is used. The transmission 9 contains a plurality of gear members that are configured for direct drive or effect a change in speed of the power take-off shaft 10, so that the drive shaft 7 and thus the mixing tools 5 can be driven at different speeds.

The details which have so far been described correspond to the constructional design of conventional feed mixers and accordingly do not have to be explained again in detail.

The feed mixer 1 further includes a control means 100 which contains a computer or processor and a display and control panel 102. The panel 102 is preferably assigned to the tractor 8 and can be easily reached and viewed by an operator. The panel 102 contains information means and also selection means, if necessary, for selecting a preferred mode of operation and/or for setting limit values, as shall be explained in the following in more detail. The control means 100 performs the shifting of the transmission 9 and is connected for this purpose to the transmission 9 in the usual manner.

The feed mixer 1, specifically container 3 thereof, has assigned thereto a means 103 for determining the weight, the means containing, for example, a weighing computer 101 which is used for indicating the weight during loading or when the feed is discharged in metered portions, and informs the driver about the current weight. The weight detecting means may comprise one of the standard weight sensors with weighing bars or other means with which a weight can be detected and with which a signal adapted to be processed by the control means 100 can be generated. When a plurality of sensors of weighing bars are used, these may be combined to form a "junction box", and the weight signals are supplied to the control means 100 in added-up form. Each of the signals, however, can also be passed on to the control means 100 directly. However, it is also possible to use just one single sensor or weighing bar because these are in a specific relation with the total weight. The weight detecting means 103 can be arranged and configured such that it just detects the weight of the feed. However, it is also possible to detect the overall weight of the filled-in feed and feed mixer and to deduct the previously determined dead weight of the feed mixer 1. The weight of the filled-in feed, however, can also be calculated, for instance when the type of feed is known and input in advance into the control device, and when the volume of the filled-in feed is detected during filling and/or discharge of the feed from the container 3 and transmitted to the control means 100. For instance, the weight of the feed still contained in the container 3 can be calculated out of a feed distribution program, the feed distribution program exactly defining at which feeding place how much feed is dispensed. The calculation of the weight may also take into account the known consistency of the feed, for example whether a particularly dense feed (bale shape) is input or a loose feed which can be easily separated. The type of feed (long fiber or short fiber, wet or dry) can also be taken into account by the control means 100. These parameters are preferably entered manually via the display panel 102.

The control means 100 produces a signal from the available and above-described parameters, the signal being equivalent to the weight of the feed in the container 3, and such a weight value can be modified, if necessary, by the above-described parameters, which influence the power demand during mixing.

The control means 100 includes a weight limit value which is equivalent to the load bearing capacity of all drive elements, particularly the power take-off shaft 10 and the transmission 9. Preferably, this limit value can be adjusted so that it can be adapted by the user to the special constructional designs, for example, of the power take-off shaft, or the like, and to the available drive power. Since the power demand can vary for different feed rations, it should be possible for the control means to adjust the limit value per feed ration. The limit values and/or the weight can be set by the operator to "0".

A weight limit value suited for the illustrated feed mixer 1, including its three mixing augers 5, is 10000 kg.

The control means 100 compares the detected or calculated limit value with the weight limit value and decides whether a shifting operation is imperative or possible. The control means 100 prevents, for example, upshifting to a higher gear with a higher speed on the mixing tools when the limit value is exceeded. The control means 100 further decides that in cases where the weight limit value is exceeded a downshifting operation to a lower gear with a lower speed and thus a higher torque on the mixing tools 5 is required, and performs such an operation automatically.

Embodiments of particularly suited transmissions are shown in FIGS. 2 and 3. These transmissions are based on the construction as described in the non-prepublished U.S. Ser. No. 11/041,083 (German utility model application 20 2004 00 1818.7), the disclosure of which is herewith included by reference.

FIG. 2 shows a first embodiment of an automatic transmission 9 configured in accordance with the invention, in the form of a pure cylindrical gear. The transmission 9 is a reduction gear and comprises a housing 10 in which an input shaft 11 and an output shaft 12 are mounted. In the shown embodiment, the input shaft 11 is arranged coaxially with the output shaft 12. When it is used as a reduction gear in FIG. 1, the input shaft 11 is connected to the power take-off shaft 10 and the output shaft 12 is connected to the drive shaft 7.

The transmission 9 is a shiftable multi-step transmission with gear members in the form of gearwheels and contains a first gear stage A which is designed as a starting stage for a starting operation and provides a gear reduction of the higher speed of the input shaft 11 to a lower speed at the output shaft 12. The transmission 9 further contains a gear stage I which provides a higher speed at the output shaft 12, as it is, for example, convenient and common for mixing and discharging feed. In the represented embodiment, the gear stage I permits a direct drive of the output shaft 12 at the speed of the input shaft 11.

The transmission 9 contains a first gearwheel 13 which is designed as a spur gear and is fixedly mounted on the input shaft 11. The first gearwheel 13 meshes with a second gearwheel 14 having a smaller diameter with respect to the first gearwheel 13, it is seated on a bypass shaft 15 mounted in the housing 10 and is provided with an overrunning clutch 16. The overrunning clutch 16 permits a drive transmission from the first gearwheel 13 via the second gearwheel 14 to the bypass shaft 15 and is preferably designed as clamp body type overrunning clutch.

The bypass shaft 15 contains a third gearwheel 17 which is non-rotationally seated on the shaft 15 and the diameter of which is preferably smaller than that of the second gearwheel 14. The third gearwheel 17 meshes with a fourth gearwheel 18 which is fixed onto the output shaft 12. The gearwheel 18 has a diameter which is preferably larger than that of the third gearwheel 17 and that of the first gearwheel 13. However, the third gearwheel 17 could be as large as the second gearwheel 14 and the fourth gearwheel 18 could be as large as the first gearwheel 13.

A clutch 19 is provided between the output shaft 12 and the input shaft 11, which clutch is preferably actuated hydraulically and couples the output shaft 11 directly to the input shaft 11 when it is engaged, while in the disengaged state of the clutch 19, the input shaft 11 and the output shaft 12 can rotate independently of one another. The clutch is preferably a hydraulic multi-disk clutch (short reaction time) with a very small volume of, for example, 20 cm$^3$, which couples from approx. 20 bar; however, it could also be any other synchronized, mechanical or electric clutch.

The housing 10 has further arranged therein a shifting device 20 which acts on the hydraulic circuit for actuating the clutch 19. The shifting device 20 is in principle a pump comprising a proportional valve with an electronic system which controls engagement, i.e. coupling, specifically the oil flow and starting pressure upon clutch engagement (smooth start without shocks). The shifting device 20 serves a shifting to the first gear stage I independently of the hydraulic circuit of the tractor and only via the starting stage A. The control of the clutch, however, could also be effected via the control means 100 (Isobus system).

The shifting device 20 contains a gear pump 21 which is driven at the starting stage A particularly via the fourth gearwheel 18 and builds up a hydraulic fluid pressure by means of this drive. The shifting device furthermore contains a proportional valve (not shown) which determines the pressure to which the pump 21 has to raise the hydraulic fluid, so that the clutch 19 can be shifted.

A cooling system 40 and a hydraulic fluid circuit 50 are also provided.

The transmission 9 works as follows. If the drive is switched on via the power take-off shaft 10, first the input shaft 11 with the first gearwheel 13 rotates while the proportional valve blocks an engagement of the hydraulic clutch 19 (pump without pressure). Thus, shifting is not possible. As a consequence, the drive is running via the starting stage A, i.e. the first gearwheel 13 drives the second gearwheel 14, the gearwheel 14 and the overrunning clutch 16 drive the bypass shaft 15 and the third gearwheel 17, and the third gearwheel 17 drives the fourth gearwheel 18 and the output shaft 12. The output shaft 12 then drives the mixing tools 5 via the angular gears 6 at a low speed and, consequently, a high torque.

At the same time, however, the gear pump 21 of the shifting device 20 is also driven by the fourth gearwheel 18, which increases the pressure of the hydraulic fluid and permits a shifting of the hydraulic clutch 19.

If the clutch 19 is shifted, at the gear stage I the fourth gearwheel 18 is directly driven by the input shaft 11, this time at a higher speed than via the starting stage A. The fourth gearwheel 18 now drives the third gearwheel 17 and thus the bypass shaft 15 in a reverse direction of transmission, i.e. in a direction back to the input shaft 11, the bypass shaft 15 now rotating faster than the second gearwheel 14 which is, as before, driven by the first gearwheel 13. Thereby, the overrunning clutch 16 is disengaged and separates the drive train via the starting stage A.

If the input shaft 11 stands still, the gear pump 21 is also not driven any more and the pressure drops to zero, so that upon renewed start the drive is again first effected via the starting stage A.

The transmission 9 is particularly suited for mixing devices up to approx. 25 m$^3$, i.e. medium to large mixing wagons. At the starting stage A and in the mixing operation, a step-down ratio of approx. 1.7:1 is used; during the metering operation, a ratio of 1:1 is used.

For enhancing safety and for protecting the elements in the drive train the transmission 9 is further provided with the following components. For instance, a means 104 is provided for sensing the temperature in the transmission 9. The means 104 may be a standard temperature pick-up or sensor. Preferably, the means 104 is directly provided on the clutch 19 (multi disk clutch) where the highest temperatures arise during shifting. The means 104 is connected to the controller 100 and supplies a temperature-equivalent signal to said controller. The controller 100 compares said signal with a predetermined temperature limit value and prevents the clutch 19 from being shifted when the temperature is excessively high and releases shifting of the clutch 19 when the temperature is below the limit value. When it is indicated on the display panel 102 that the limit value is exceeded, this informs the user that for example the clutch slips and/or the cooling system 40 does not function.

The controller 100 may further include a timer which prevents the shifting operations, particularly on the clutch 19, from succeeding one another too rapidly and the clutch 19 from heating up too much. The time delay ensures that the clutch 19 is sufficiently cooled by the cooling means 40 before a renewed shifting operation takes place. This is particularly important when start operations are frequently carried out.

The transmission 9 may further be provided with a speed sensor 105 which is also connected to the controller 100. The speed sensor is arranged near the input shaft 11 and detects the speed of said input shaft. This speed sensor prevents damage caused by an incorrect adjustment and prevents damage to the clutches in case of an operation at an excessively low speed. Instead of the speed sensor 105, it is also possible to provide a means for measuring the torque. The speed sensor permits a high degree of monitoring of the transmission 9 and protects the clutches from an excessively high torque when the prime mover (engine) of the tractor stalls under high load.

Furthermore, a means 106 is provided for detecting the pressure in a hydraulic fluid circuit 50 which operates the clutch 19. The means 106 is also connected to the control means 100 and ensures that enough pressure and enough oil are provided for actuating the clutch 19.

The transmission 9 according to FIG. 2 can be expanded by one or several further gear stages, FIG. 3 showing an embodiment of a transmission 29 in which the starting stage A and the gear stage I of the embodiment according to FIG. 2, and in addition a further gear stage II are provided. The structural design of the starting stage A and the gear stage I correspond to the embodiment according to FIG. 2 and are provided with the same reference numerals and not explained again. At the starting stage A, however, a gear reduction in the range of about 3.5-4.0:1 is realized, and at the gear stage I, a ratio of 1:1 is again realized. The gear stage II is also a gear stage with a higher speed (transmission ratio about 1.7:1), its speed, however, is between that of the starting stage A and the gear stage I; it thus delivers a speed at the output shaft 12 which is higher than at the starting stage A, but lower than at the gear stage I, so that one can choose between a lower speed at the gear stage II, as it can be employed, for example, for mixing, and a higher speed at the gear stage I, as it can be used, for example, for discharging the feed from the container 3. Here, with an input speed of 1000 rpm, the speeds during the starting operation are 250-300 rpm, during the mixing operation 500-650 rpm, and during the metering operation up to 1000 rpm.

The gear stage II is also designed as a cylindrical gear and contains a fifth gearwheel 30 which is seated on a bypass shaft 31 which is mounted in the housing 10 and meshes with the first gearwheel 13. Preferably, between the fifth gearwheel 30 and the bypass shaft 31, a second overrunning clutch 32 is provided, which, however, is not absolutely necessary, as described below.

The fourth gearwheel 18 meshes with a sixth gearwheel 33 which is also rotatably mounted in the housing 10. The sixth gearwheel 33 is mounted coaxially with the axis of the second bypass shaft 31 and can be connected to the second bypass shaft 31 in motion-transmitting fashion by means of a clutch 34, preferably a hydraulic multi-disk clutch.

The fifth gearwheel 30 is preferably relatively small with respect to the first gearwheel 13 and smaller than the sixth gearwheel 33, while the sixth gearwheel 33 is small with respect to the fourth gearwheel 18 and the fourth gearwheel 18 is larger than the first gearwheel 13. Therefore, a preferably low torque has to be shifted by the clutch.

The transmission 29, too, contains the shifting device 20 with the gear pump 21, which in this case, however, is driven via the sixth gearwheel 33 for reasons of design. The shifting device 20 acts on the clutch 34 in this embodiment and prevents the engagement of the clutch 34 as long as the necessary pressure has not been built up yet via the starting stage A.

After the necessary pressure has been built up by the gear pump 21, the clutch 34 can be shifted. If the clutch 34 is shifted, the first gearwheel 13 drives the fifth gearwheel 30, and with a connected overrunning clutch 32, the bypass shaft 31 drives the sixth gearwheel 33, and the same drives the fourth gearwheel 18 and thus the output shaft 12. The fourth gearwheel 18, however, also rotates the third gearwheel 17 and the bypass shaft 15 of the starting stage A, so that the overrunning clutch 16 is released.

If the speed is to be further increased, the first clutch 19 is shifted. If there is a second overrunning clutch 32, the hydraulic clutch 34 of the gear stage II can remain engaged. Then, the drive of the output shaft 12 is directly effected by the input shaft 11, while the first gearwheel 13 drives the fifth gearwheel 30 and the fourth gearwheel 18 drives the sixth gearwheel 33, which either leads to a release of the overrunning clutch 32 if the hydraulic clutch 34 is engaged, so that thereby the described driving motion is possible, or else the second hydraulic clutch 34 is released which makes the second overrunning clutch 32 superfluous. At the gear stages I and II, the gear pump 21 is thus also driven and maintains the pressure.

However, if the drive is stopped, the pressure generated by the gear pump 21 drops, and in the next starting operation, the starting stage A is again available.

The transmission 29 also contains the means described already with reference to FIG. 2, which are used for determining the most different parameters. For instance, means 104a, 104b are each provided for detecting the temperature. The means 104a, 104b are each assigned to one of the clutches 19, 34 and show the same action as means 104, which has been described with reference to FIG. 2.

The transmission 29 also contains the means 105 for detecting a speed or a torque assigned to the input shaft 11. The means 105 corresponds to means 105 as has already been described with reference to FIG. 2.

Finally, in this embodiment the means 105 is also provided for detecting the pressure of a hydraulic fluid in a hydraulic circuit 50 for actuating the clutches 19, 34, as has already been described with reference to FIG. 2. The transmission 29 of FIG. 3 has also assigned thereto the already described timer so that a cooling of the clutches 19, 34 is ensured via the coolant circuit 40.

When the feed mixer is used, said mixer is first started so that the drive is running.

The operator will then leave the tractor and load the mixing container with the help of another device. It stands to reason that the feed mixer is first running at maximum speed as the mixer is empty and gradually reaches a point at which the mixer speed is downshifted when the mixer is loaded and the load on the drive rises, so as to prevent the tractor from stalling, to save fuel, to protect the drive train, or to be able to use a low-performance drive. The mixing of the feed can then be completed in a lower gear, which requires an automatic downshifting. The mixer is then switched off for transportation. The mixer must then be restarted, in the lowermost gear, to move the feed in the container 3. The mixer must then be shifted into a higher gear to be able to dispense and distribute the feed at an acceptable high speed. Finally, the mixer must run at maximum speed to provide adequate speed for emptying the mixing container completely.

With the configuration according to the invention this mode of operation can be accomplished without the risk that the transmission changes in the meantime between the individual gears too often and unnecessarily. The use of a weight value for controlling the shifting operation provides for a stable value which does not change with a short period of time, as is the case with torque or speed.

Rather, the change in weight is foreseeable and controllable as the amount of the feed in the container only changes in a controlled and foreseeable manner because both loading and unloading of the mixing container take place substantially continuously or in predictable steps. It is further ensured by the means 104 to 106 that also weight-independent parameters, if exceeding an acceptable degree, influence the shifting operations of the transmission 9, 29 such that damage within the system is prevented.

The above-described components, especially the clamp body type overrunning clutches and the multi disk clutches are particularly suited for the purposes of the present invention because the clamp bodies act without shocks and substantially immediately (less than 1° delay). Multi disk clutches are much more efficient than torque converters and can cope with a high inertia under certain conditions. The transmissions 9, 29 shift fully automatically, but offer a complete control through the selected speed. The system can be easily adapted to the available power of the tractor. The transmission can be downshifted to lower speeds without any problems, the clamp bodies acting automatically and without shocks. The control means further provides for complete protection of the clutches and a control of slip, temperatures and pressures.

During operation, the mixing means starts in the empty state and automatically shifts from the first to the second (time delay) and the third (time delay) gear, on condition that this is made possible by an adequate pressure, an acceptable temperature and an acceptable speed. When the weight limit value is then exceeded during loading, downshifting to the second gear is first carried out. When the net weight limit value is exceeded, downshifting to the first gear is then carried out (overload). When the mixing operation has been completed, the power take-off shaft is switched off and the engine is stopped. During renewed start of the drive, shifting from the first to the second gear is automatically carried out, on condition that this is permitted by the detected temperature, the weight, the pressure and the speed under full load (first set for the specific type of feed, etc.).

When the start operation fails, the means for detecting the speed stops the attempt and the timer defines when the next attempt can be started. The means for detecting the temperature prevents damage caused by overload or slipping. If the start operation is successful, the feed is discharged in the second gear. When the amount of discharged feed has been so great that the weight falls below the predetermined weight limit value, the system shifts automatically into the third gear if this is permitted by the detected speed, the temperature, the hydraulic pressure, etc.

The invention claimed is:

1. A feed mixer comprising:
a mixer container for receiving feed;
at least one mixing tool rotatingly arranged in the mixing container;
a drive means for driving the mixing tool;
an automatically shiftable transmission which is connected to the drive means and has a low shifting stage for a first speed of the mixing tool and at least one higher shifting stage for a second speed of the mixing tool, the second speed being higher than the first speed;
a control means for shifting the transmission;
a means for detecting the weight of the feed to be mixed; and
a means for comparing the detected weight with a predetermined limit value for at least the higher shifting stage, which is connected to the control means such that a driving of the mixing tool via the higher shifting stage will only be possible if the detected weight does not exceed the limit weight.

2. The feed mixer according to claim 1, wherein the control means is configured such that a shifting into the higher shifting state is prevented if the detected weight exceeds the limit value.

3. The feed mixer according to claim 1, wherein the control means is configured such that shifting from the higher shifting stage into the low shifting stage is carried out automatically if the detected weight exceeds the limit value.

4. The feed mixer according to claim 1, wherein the control means is configured such that shifting into the higher shifting stage is carried out automatically if the detected weight is below the limit value.

5. The feed mixer according to claim 1, further containing a means for detecting a temperature on the transmission, a means for comparing the detected temperature with a temperature limit value, and a means for preventing a shifting operation if the detected temperature exceeds the limit value.

6. The feed mixer according to claim 5, wherein the transmission contains a clutch which is cooled with a coolant, and the means for detecting the temperature contains a means for detecting the temperature in the coolant.

7. The feed mixer according to claim 5, further containing a timer for preventing a second shifting operation within a predetermined time interval after a first shifting operation.

8. The feed mixer according to claim 1, further containing a means for detecting an input speed in the transmission, a means for comparing the detected speed with a speed limit value, and a means for preventing a shifting operation if the detected speed is below the limit value.

9. The feed mixer according to claim 1, wherein the transmission contains a clutch actuated by a hydraulic fluid, and a means for detecting a pressure in the hydraulic fluid on the clutch.

10. The feed mixer according to claim 1, wherein the low shifting stage of the transmission comprises a starting stage with a clamp body type overrunning clutch.

11. The feed mixer according to claim 1, wherein the higher shifting stage of the transmission contains a multi disk clutch.

12. The feed mixer according to claim 1, wherein the weight limit value is adjustable.

13. The feed mixer according to claim 1, wherein the weight limit value is adjusted to a weight of 10,000 kg.

14. The feed mixer according to claim 1, wherein a weight sensor is provided for measuring the weight of the feed.

15. A method for driving a mixing tool for mixing feed in a feed mixer, wherein the mixing tool is rotatingly driven by a drive via an automatically shiftable transmission with a low shifting stage at a low speed and with at least one higher shifting stage at a higher speed, wherein the weight of the feed is determined and compared with a predetermined limit value for at least the higher shifting stage, and wherein the mixing tool is only driven via the higher shifting stage if the detected weight does not exceed the limit value.

16. The method according to claim 15, wherein shifting into the higher shifting stage is prevented if the detected weight exceeds the limit value.

17. The method according to claim 15, wherein shifting from the higher shifting stage into the lower shifting stage is carried out automatically if the detected weight exceeds the limit value.

18. The method according to claim 15, wherein shifting into the higher shifting stage is carried out automatically if the detected weight is below the weight limit value.

19. The method according to claim 15, wherein a temperature is detected on the transmission and compared with a temperature limit value, and wherein shifting is prevented if the detected temperature exceeds the limit value.

20. The method according to claim 15, wherein the transmission contains a clutch which is cooled with a coolant, and the temperature in the coolant is determined.

21. The method according to claim 15, wherein a second shifting operation is prevented within a predetermined time interval after a first shifting operation.

22. The method according to claim 15, wherein an input speed in the transmission is detected, the detected speed is compared with a speed limit value, and a shifting operation is prevented if the detected speed is below the limit value.

23. The method according to claim 15, wherein the transmission contains a clutch actuated by a hydraulic fluid and a pressure is detected in the hydraulic fluid on the clutch.

24. The method according to claim 15, wherein the low shifting stage of the transmission includes a starting stage with a clamp body type overrunning clutch.

25. The method according to claim 15, wherein the higher shifting stage of the transmission contains a multi disk clutch.

26. The method according to claim 15, wherein the weight limit value is adjustable.

27. The method according to claim 15, wherein the weight limit value is set to a weight of 10,000 kg.

28. A feed mixer according to claim 15, wherein a weight sensor is provided for measuring the weight of the feed.

29. The feed mixer according to claim 15, wherein the weight is calculated.

* * * * *